United States Patent
Sugiura et al.

(10) Patent No.: US 8,173,563 B2
(45) Date of Patent: May 8, 2012

(54) SINTERED BODY AND PRODUCTION METHOD THEREOF

(75) Inventors: Kei Sugiura, Tokyo (JP); Takeshi Urano, Tokyo (JP); Hiroyuki Ono, Tokyo (JP)

(73) Assignee: TDK Corporation, Chuo-Ku, Tokyo (JP)

(*) Notice: Subject to any disclaimer, the term of this patent is extended or adjusted under 35 U.S.C. 154(b) by 4 days.

(21) Appl. No.: 12/625,024

(22) Filed: Nov. 24, 2009

(65) Prior Publication Data

US 2010/0134926 A1 Jun. 3, 2010

(30) Foreign Application Priority Data

Nov. 28, 2008 (JP) ................ P2008-304586

(51) Int. Cl.
*G11B 5/60* (2006.01)
*C04B 35/117* (2006.01)
*C04B 35/56* (2006.01)

(52) U.S. Cl. ........ 501/127; 501/87; 428/813; 428/815.1

(58) Field of Classification Search .............. 501/87, 501/127; 428/813, 815.1
See application file for complete search history.

(56) References Cited

U.S. PATENT DOCUMENTS

| | | | |
|---|---|---|---|
| 4,356,272 A * | 10/1982 | Kanemitsu et al. | 501/87 |
| 4,582,812 A * | 4/1986 | Furukawa et al. | 501/87 |
| 4,598,052 A * | 7/1986 | Wada et al. | 501/87 |
| 5,246,893 A * | 9/1993 | Takagi et al. | 501/87 |
| 5,342,564 A * | 8/1994 | Wei et al. | 264/656 |
| 5,595,946 A | 1/1997 | Tsujimoto et al. | |
| 5,595,947 A * | 1/1997 | Tsujimoto et al. | 501/87 |
| 7,381,670 B2 * | 6/2008 | Sugiura et al. | 501/87 |
| 2006/0293166 A1 * | 12/2006 | Sugiura et al. | 501/127 |
| 2010/0137123 A1 * | 6/2010 | Sugiura et al. | 501/87 |

FOREIGN PATENT DOCUMENTS

| | | | |
|---|---|---|---|
| JP | 57205365 | * | 12/1982 |
| JP | 01167272 | * | 6/1989 |
| JP | 04321555 | * | 11/1992 |
| JP | 08026819 | * | 1/1996 |
| JP | 8-34662 | | 2/1996 |
| JP | 2006347798 | * | 12/2006 |
| JP | 2008084520 | * | 4/2008 |

* cited by examiner

*Primary Examiner* — Karl Group
(74) *Attorney, Agent, or Firm* — Drinker Biddle & Reath LLP

(57) ABSTRACT

An object is to provide a sintered body causing less chipping and having a sufficiently higher polishing rate than a conventional AlTiC sintered body, and providing a sufficiently smooth air bearing surface. The sintered body according to the present invention consists of $Al_2O_3$, a compound represented by the chemical formula (1) below, and a composite oxide containing Al and Ti, $$TiC_xO_y \quad (1)$$

wherein $x+y \leq 1$, $x>0$ and $y>0$.

2 Claims, 3 Drawing Sheets

SINTERED BODY AND PRODUCTION METHOD THEREOF

BACKGROUND OF THE INVENTION

1. Field of the Invention

The present invention relates to a sintered body and, more particularly, to a sintered body suitable for a magnetic head slider, and a production method thereof.

2. Related Background Art

A hard disk drive (HDD) is equipped with a magnetic head slider for writing and reading information onto and from a hard disk. Recently, the magnetic head slider is also being downsized with increase in recording density and reduction in size of the hard disk drive.

The magnetic head slider has a configuration in which a magnetic head is mounted on a substrate, and this substrate is generally composed of a ceramic sintered body. The ceramic sintered body for the substrate recently commonly known is a high-strength sintered body consisting primarily of alumina and titanium carbide, so called an AlTiC sintered body (cf. Japanese Patent Application Laid-open No. 8-34662).

SUMMARY OF THE INVENTION

For further downsizing of the magnetic head slider, it is necessary to improve accuracy of microfabrication of the magnetic head slider. Specifically, when an air inlet groove is formed by processing an air bearing surface of the magnetic head slider, it is required to suppress chipping (cracking) at a processed part. The reason for it is that as the magnetic head slider becomes smaller, the chipping of the magnetic head slider tends to more significantly interfere with control of a fly height (height of the magnetic head relative to the hard disk) and has raised the possibility of crash between the magnetic head and the hard disk.

Furthermore, the fly height is also decreasing with increase in recording density and reduction in size of the hard disk drive. However, the crash becomes more likely to occur as the fly height decreases. For enabling further decrease of the fly height, therefore, it is needed to suppress the chipping of the magnetic head slider to improve controllability of the fly height and prevent the crash.

In addition, for producing the magnetic head slider using the AlTiC sintered body, a generally adopted method is to lay a laminate including the magnetic head, on the substrate of the AlTiC sintered body, to cut the resultant body in parallel with a lamination direction to form an exposed surface of the magnetic head, and to polish (or lap) this exposed surface to form the air bearing surface.

In the conventional method, a polishing rate of the substrate (AlTiC sintered body) is lower in the polishing step than that of the laminate including the magnetic head and thus a polishing amount of the laminate is larger than that of the substrate, which leads to a tendency to make a large level difference in the air bearing surface between the substrate and the laminate. This level difference is undesirable because it makes the control of the fly height difficult. There is, therefore, a demand for reducing the level difference in the air bearing surface caused by the difference between the polishing rates of the substrate and the laminate laid on the substrate, in the lapping step and thereby smoothing the air bearing surface.

In the production of the magnetic head slider, the air bearing surface is processed by ion milling, which is a kind of dry etching, to form the air inlet groove, and for improving the controllability of the fly height, it is also required to further lower the surface roughness of the air bearing surface processed by dry etching (which will be sometimes referred to as "dry etched surface") and thereby to smooth the dry etched surface.

The present invention has been accomplished in view of the above circumstances and an object of the present invention is to provide a sintered body causing less chipping and having a sufficiently higher polishing rate than the conventional AlTiC sintered body, and providing a sufficiently smooth air bearing surface, and a production method of the sintered body.

In order to achieve the above object, a sintered body according to the present invention is one consisting of $Al_2O_3$, a compound represented by the chemical formula (1) below (which will be sometimes referred to as "$TiC_xO_y$"), and a composite oxide containing Al and Ti. Namely, the sintered body according to the present invention consists of three phases, a phase consisting of $Al_2O_3$, a phase consisting of $TiC_xO_y$, and a phase consisting of the composite oxide of Al and Ti. The "compound represented by the chemical formula (1) below" in the present invention is a compound which consists of Ti, C, and O and an average composition of which is expressed by the chemical formula (1) below. In other words, in the present invention, local compositions of the phase of $TiC_xO_y$ may deviate from the composition represented by the chemical formula (1) below but the average composition of the entire phase of $TiC_xO_y$ is represented by the chemical formula (1) below:

$$TiC_xO_y \qquad (1)$$

wherein $x+y \leq 1$, $x>0$ and $y>0$.

The sintered body of the present invention causes less chipping in the magnetic head slider and has a sufficiently higher polishing rate than the conventional AlTiC sintered body, and provides a sufficiently smooth air bearing surface.

It was found by the Inventors' research that since the sintered body of the present invention had the phase consisting of the composite oxide containing Al and Ti, in addition to the phase consisting of $Al_2O_3$ and the phase consisting of $TiC_xO_y$, occurrence of chipping was more suppressed than in the case where the sintered body was composed of the two phases of the phase consisting of $Al_2O_3$ and the phase consisting of $TiC_xO_y$.

It was also found by the Inventors' research that the whole air bearing surface was more likely to be evenly etched in the step of processing the air bearing surface by ion milling being a kind of dry etching and the dry etched surface was more likely to smooth than in the case where the sintered body further had a phase consisting of another compound (e.g., carbon), in addition to the phase consisting of $Al_2O_3$ and the phase consisting of $TiC_xO_y$.

The foregoing sintered body of the present invention preferably satisfies the condition of $0.3 < y \leq 0.52$.

As the molar ratio y of oxygen in $TiC_xO_y$ becomes smaller, there is a tendency to reduce the effect of increasing the polishing rate of the sintered body or the effect of suppressing the occurrence of chipping. Furthermore, the sintered body with larger y is more likely to deform in a firing step in its production and, with use of such a sintered body, there is a tendency to make it difficult to produce the magnetic head slider required to have the smooth air bearing surface. In contrast to it, the sintered body of the present invention can reduce these tendencies when it satisfies the condition of $0.3 < y \leq 0.52$.

The present invention provides a suitable production method of the aforementioned sintered body of the present invention. Namely, a method for producing the sintered body according to the present invention comprises a step of hot pressing a raw material powder containing $Al_2O_3$, TiC and $TiO_2$, under a pressure in the range of 100 to 200 $kgf/cm^2$. It should be noted that in the present invention the "hot press" means to fire the raw material powder under pressure (compression) by a uniaxial pressing method.

This production method allows us to obtain the aforementioned sintered body of the present invention having the above-described configuration, causing less chipping and having the sufficiently higher polishing rate than the conventional AlTiC sintered body, and providing the sufficiently smooth air bearing surface.

In the foregoing production method of the sintered body of the present invention, a content of $TiO_2$ in the raw material powder is preferably in the range of 12 to 24% by mass.

This makes it possible to obtain the sintered body of the present invention where $0.3 < y \leq 0.52$.

The present invention successfully provides the sintered body causing less chipping and having the sufficiently higher polishing rate than the conventional AlTiC sintered body, and providing the sufficiently smooth air bearing surface, and the production method of this sintered body.

DESCRIPTION OF THE PREFERRED EMBODIMENTS

The preferred embodiments of the present invention will be described below with reference to the drawings.

[Sintered Body]

First, the sintered body according to a preferred embodiment will be described.

The sintered body of the present embodiment is an AlTiC sintered body consisting of three phases, a crystal phase of $Al_2O_3$ (alumina), a crystal phase of a compound represented by the chemical formula (1) below, and a crystal phase of a composite oxide containing Al and Ti (which will be sometimes referred to as "Al—Ti—O"). It is noted herein that the sintered body is one obtained by sintering a combination of raw materials of these components, as described below.

$TiC_xO_y$ (1)

wherein $x+y \leq 1$, $x > 0$ and $y > 0$.

In the case of $x+y=1$, the crystal phase of $TiC_xO_y$ is one consisting of TiCO. In the case of $x+y<1$, the crystal phase is one consisting of TiCO with vacancies due to partial loss of C or O. In the case of $x+y>1$, the rock salt type crystal structure cannot be maintained and thus workability of the sintered body tends to worsen; however, the present embodiment suppresses this tendency because $x+y \leq 1$. For achieving the effect of the present invention more definitely, it is preferable to satisfy the condition of $0.5 < x+y$.

In the present embodiment, preferably, $0.3 < y \leq 0.52$.

As the molar ratio y of oxygen in $TiC_xO_y$ becomes smaller, there is a tendency to reduce the effect of increasing the polishing rate of the sintered body or the effect of suppressing the occurrence of chipping in the magnetic head slider. Furthermore, the sintered body with larger y is more likely to deform in a firing step in its production and there is a tendency to make it difficult to produce the magnetic head slider. In contrast to it, the present embodiment reduces these tendencies because $0.3 < y \leq 0.52$.

Figure 1:
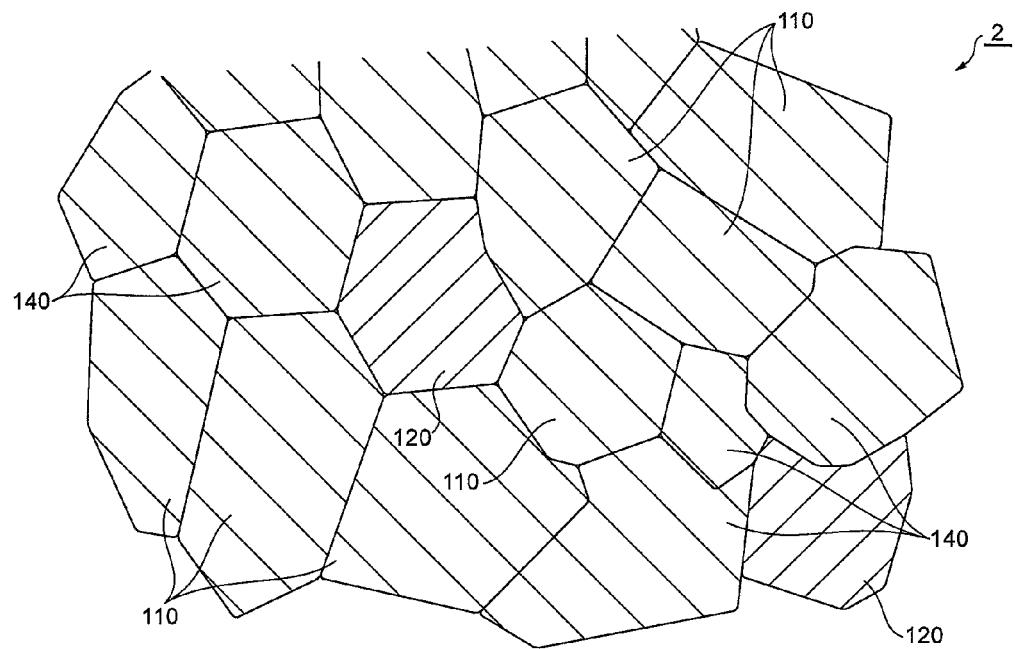
FIG. 1 is a schematic view showing an enlarged sectional configuration of a sintered body according to a preferred embodiment.

FIG. 1 is a schematic view showing an enlarged sectional configuration of the sintered body of the preferred embodiment. As shown in FIG. 1, the sintered body 2 is composed of three types of crystal grains, crystal grains 110 of $Al_2O_3$, crystal grains 120 of $TiC_xO_y$, and crystal grains 140 of Al—Ti—O.

A mean diameter of the crystal grains 110 of $Al_2O_3$ in the sintered body is, for example, in the range of 0.05 to 1.0 μm and a mean diameter of the crystal grains 120 of $TiC_xO_y$ is, for example, in the range of 0.05 to 0.5 μm. A mean diameter of the crystal grains 140 of Al—Ti—O is, for example, in the range of 0.05 to 1.0 μm. These mean diameters of crystal grains can be determined, for example, as follows. First, the sintered body is fractured and its fractured surface is mirror finished and thermally etched at a temperature of (sintering temperature −100)° C. The surface is photographed at the magnification of 30000× with a scanning electron microscope and straight lines are radially drawn on the photograph. Specifically, on the rectangular photograph of 9 mm vertical× 12 mm horizontal, a vertical straight line, a horizontal straight line, and two diagonal straight lines are drawn so as to pass a center of the photograph (the total length of the straight lines is 51 mm). Then the number of intersections where each straight line crosses crystal grain boundaries is counted and each of the mean diameters of the respective crystal grains can be determined by calculation of (total extension of straight lines (mm))/(total number of intersections×magnification of photograph).

In the sintered body of the present embodiment, the lattice constant of $TiC_xO_y$ is preferably less than 432.0 pm (picometer). This achieves more definite improvement in the polishing rate of the sintered body. The lattice constant of $TiC_xO_y$ in the present specification is, for example, that of the crystal grains of $TiC_xO_y$ described above, and can be measured as follows. Specifically, first, a measurement sample obtained by pulverizing the sintered body is mixed with a standard sample of Si (e.g., silicon powder for a physical angle standard: RSRP-43275G) and the mixture is subjected to X-ray measurement in the range of $2\theta=15$ to 90°. This measurement result is corrected for the angle of $2\theta$ from a diffraction line of Si of the standard sample observed with the measurement sample. After the angle correction, the lattice constant of space group Fm3m (crystal structure of $TiC_xO_y$) is then determined. This lattice constant can be calculated using a predetermined analysis software application, e.g., JADE ver. 5 available from Rigaku Corporation. A diffraction line of the (2,2,2) face of space group Fm3m around $2\theta=76°$ overlaps the diffraction line of Si and thus these diffraction lines are not used for the correction for the angle of $2\theta$ and the calculation of the lattice constant.

The sintered body 2 of the present embodiment is preferably one wherein a value of $TiC_xO_y/Al_2O_3$ being a peak area ratio of $TiC_xO_y$ to $Al_2O_3$ is between 1.3 inclusive and 2.18, based on measurement by X-ray diffraction (XRD). Specifically, the foregoing value of $TiC_xO_y/Al_2O_3$ can be determined from a peak area ratio of the (111) plane around $2\theta=36°$ of space group Fm3m of $TiC_xO_y$ to the (104) plane around $2\theta=35°$ of space group R3-C of $Al_2O_3$ based on the measurement by XRD. When the above condition is met, it becomes easier to reduce the occurrence of void and to suppress the occurrence of chipping than in the case where the condition is not met.

The sintered body 2 of the present embodiment may contain a trace amount of another component not to affect the effect of the present invention, as needed, in addition to $Al_2O_3$, $TiC_xO_y$, and Al—Ti—O. The additional component can be, for example, titania ($TiO_2$). Since $TiO_2$ is used as a raw material of the sintered body as described below, a trace amount of $TiO_2$ may remain in the sintered body 2. Furthermore, the crystal grains 110 of $Al_2O_3$, the crystal grains 120 of $TiC_xO_y$, and the crystal grains 140 of Al—Ti—O may contain a trace amount of carbon.

[Production Method of Sintered Body]

A preferred embodiment of the production method of the aforementioned sintered body will be described below.

The first step is to prepare a raw material powder containing an $Al_2O_3$ powder, a TiC powder, and a $TiO_2$ powder. With this, reaction takes place among the powders during a hot pressing step described below, to produce $TiC_xO_y$ and Al—Ti—O in the sintered body.

A content of the $TiO_2$ powder in the raw material powder is preferably determined to be in the range of 12 to 24% by mass relative to the total amount of the raw material powder. When the content of the $TiO_2$ powder is set in this range, the molar ratio y of oxygen in $TiC_xO_y$ in the resultant sintered body can fall within the range of $0.3 < y \leq 0.52$.

If the content of the $TiO_2$ powder in the raw material powder is too small, the molar ratio y of oxygen in $TiC_xO_y$ in the resultant sintered body becomes not more than 0.3 and there is a tendency to reduce the effect of increasing the polishing rate of the sintered body.

On the other hand, if the content of the $TiO_2$ powder in the raw material powder is too high, the molar ratio y of oxygen in $TiC_xO_y$ in the resultant sintered body tends to become larger than 0.52. The shape of the sintered body with y larger than 0.52 can deform significantly from that of a compact before the hot press and it is sometimes difficult to produce the magnetic head slider. In contrast to it, the present embodiment defines the content of $TiO_2$ in the raw material powder as not more than 24% by mass whereby y can be not more than 0.52; therefore, the sintered body can be prevented from deforming.

A content of the TiC powder in the raw material powder is preferably in the range of 30 to 75 parts by mass, relative to 100 parts by mass of the $Al_2O_3$ powder. When the content of the TiC powder is in the foregoing range, reaction becomes more likely to take place between the TiC powder and the $TiO_2$ powder in the raw material powder and the sintered body is formed at a preferred ratio of the $Al_2O_3$ crystal grains and the $TiC_xO_y$ crystal grains, which facilitates implementation of excellent strength and electrical or thermal properties. If the content of TiC is off this range, it might result in reducing the effect of increasing the polishing rate of the sintered body and the effect of suppressing the occurrence of chipping.

The next step is to mix the foregoing raw material powder, for example, in an organic solvent such as ethanol, IPA, or 95% denatured ethanol and thereby obtain a mixed powder. If water is used as a liquid to be mixed with the raw material powder, the TiC powder will chemically react with water to cause oxidation of the TiC powder; therefore, it is desirable not to use water.

The mixing for obtaining the mixed powder can be implemented using a ball mill or attritor. A mixing time is preferably in the range of approximately 10 to 100 hours. The media to be used in the mixing by the ball mill or attritor can be, for example, alumina balls having the diameter in the range of about 1 to 20 mm.

Then the mixed powder is granulated by spray granulation. The spray granulation is, for example, to spray dry the mixed powder in a hot blast of an inert gas such as nitrogen or argon containing little oxygen and thereby to obtain granules of the mixed powder. The granulation is preferably carried out so that the grain sizes of the granules can be in the range of about 50 to 200 μm. The temperature of the hot blast for spray drying is preferably in the range of about 60 to 200° C.

Thereafter, an organic solvent as described above is added into the granules, as needed, to control a liquid content in the granules so that the organic solvent can be contained in the amount of about 0.1 to 10% by mass in the granules. In this process of controlling the liquid content in the granules, it is preferable not to use water as the liquid.

Then the granules are packed in a predetermined die and primarily compacted, for example, by cold press to obtain a compact in a predetermined shape. There are no particular restrictions on the die as long as it can compact the sintered body in the preferred shape; for example, the die can be a disk forming die of metal or carbon having the inside diameter of about 150 mm. The unit pressure on the granules in the cold press is in the range of approximately 50 to 150 $kgf/cm^2$ (approximately 5 to 15 MPa).

Next, the compact is hot pressed under the pressure in the range of 100 to 200 $kgf/cm^2$ (about 10-20 MPa). Namely, the granules are fired while they are uniaxially compressed by a pair of punches opposed vertically. This induces the reaction among $Al_2O_3$, TiC and $TiO_2$ in the compact to obtain the sintered body consisting of three phases, the phase of $Al_2O_3$, the phase of $TiC_xO_y$, and the phase of Al—Ti—O.

If the pressure on the compact by hot press is less than 100 $kgf/cm^2$, it becomes difficult to produce the phase of Al—Ti—O in the sintered body. If the pressure on the compact by hot press is larger than 200 $kgf/cm^2$, a phase consisting of carbon becomes likely to be made in the sintered body.

There are no particular restrictions on the shape of the sintered body obtained by hot press but the substrate is, for example, a disk or rectangular substrate having the diameter of 6 inches and the thickness of about 2.5 mm. This allows the sintered body to be suitably applied to the production of the magnetic head slider described below.

The firing temperature of the compact in hot press is preferably between 1450° C. inclusive and 1700° C. When the firing temperature is set in this range, it becomes easier to obtain the sintered body according to the present embodiment. If the firing temperature is less than 1450° C., sintering of the compact becomes insufficient, with the result that the resultant sintered body tends to include internal voids and that granules tend to drop during the lapping of the sintered body. On the other hand, if the firing temperature is not less than 1700° C., the compact can deform during the firing and the production of the magnetic head slider can be harder. The firing temperate may be varied during the sintering.

The firing time of the compact in the hot press is preferably in the range of about 1 to 3 hours. This makes it easier to obtain the sintered body of the present embodiment.

The hot press of the compact is preferably carried out, for example, in vacuum or in a nonoxidizing atmosphere such as an inert gas, e.g. Ar gas. When the compact is sintered in the nonoxidizing atmosphere, the molar ratio y of oxygen in $TiC_xO_y$ in the resultant sintered body can be controlled more easily in the range of $0.3 < y \leq 0.52$.

[Magnetic Head Slider]

Figure 2:
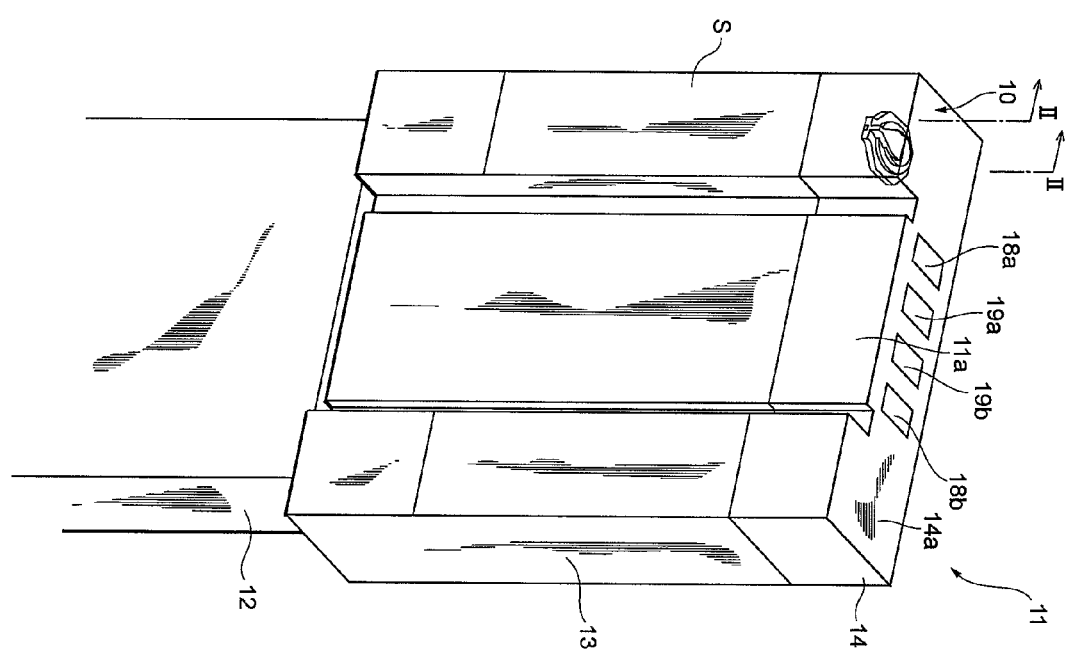
FIG. 2 is a perspective view showing a magnetic head slider according to a preferred embodiment.

The following will describe the magnetic head slider using the above-described sintered body. FIG. 2 is a perspective view showing the magnetic head slider of a preferred embodiment.

As shown in FIG. 2, the magnetic head slider 11 of the present embodiment has a thin-film magnetic head 10 and is, for example, one to be mounted on a hard disk drive (not shown) with a hard disk. This hard disk drive is configured to record and reproduce magnetic information on a recording surface of the hard disk rotating at a high speed, by the thin-film magnetic head 10.

The magnetic head slider 11 according to the embodiment of the present invention is of a nearly rectangular parallelepiped shape. In FIG. 2, the surface on the near side in the magnetic head slider 11 is a surface to be opposed to a recording medium, which is to be arranged opposite to the recording surface of the hard disk, and is called an air bearing surface (ABS) S. An air inlet groove 11a is formed in the air bearing surface S so as to extend in a direction perpendicular to a track width direction. The air inlet groove 11a formed in the air bearing surface S improves the controllability of the fly height (height of the thin-film magnetic head 10 relative to the hard disk). The forming position and shape of the air inlet groove 11a do not have to be limited only to those shown in FIG. 2.

While the hard disk rotates, the magnetic head slider 11 floats by virtue of air flow caused by the rotation, whereby the air bearing surface S is located away from the recording surface of the hard disk. The air bearing surface S may be coated with DLC (Diamond-Like Carbon) or the like.

This magnetic head slider 11 has a substrate 13 made of the aforementioned sintered body and a laminate 14 formed on this substrate 13. This laminate 14 includes the thin-film magnetic head 10. In the present embodiment, the substrate 13 has a rectangular parallelepiped shape and the laminate 14 is formed on a side face of this substrate 13.

An upper face 14a of the laminate 14 forms an end face of the magnetic head slider 11 and this upper face 14a of the laminate 14 is provided with recording pads 18a, 18b and reproducing pads 19a, 19b connected to the thin-film magnetic head 10. The thin-film magnetic head 10 is provided in the laminate 14 and is exposed in part from the air bearing surface S to the outside. In FIG. 2, the thin-film magnetic head 10 buried in the laminate 14 is indicated by solid lines in view of easier recognition.

The magnetic head slider 11 of this configuration is mounted on a gimbal structure 12 and is connected to an unrepresented suspension arm to constitute a head gimbal assembly.

Figure 3:
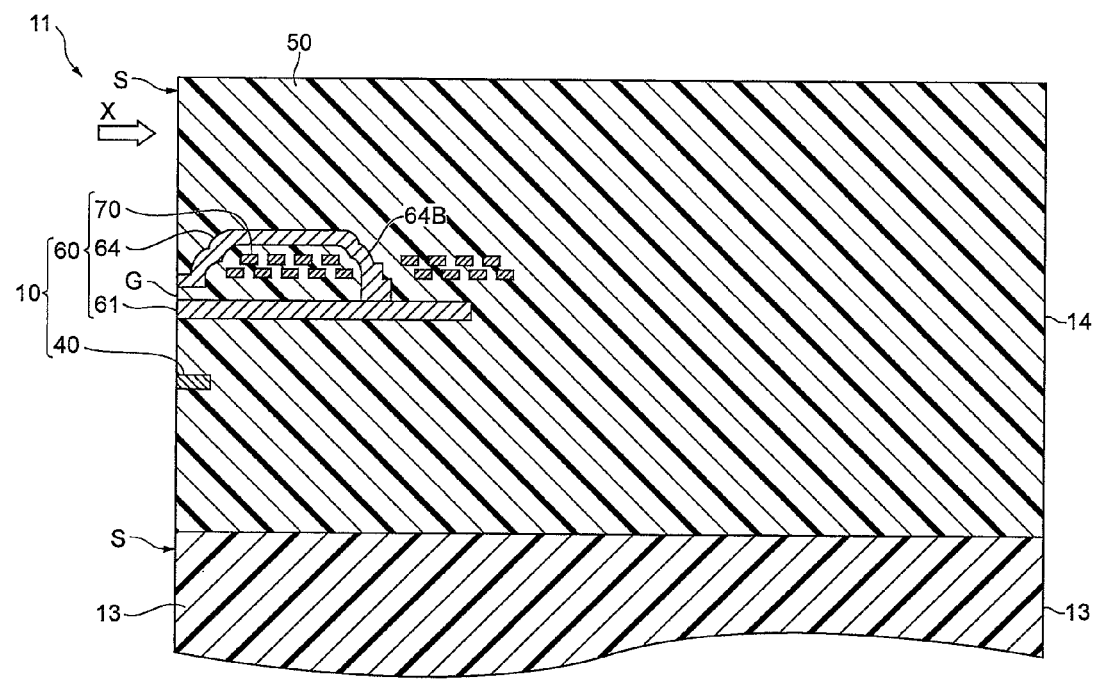
FIG. 3 is a schematic sectional view along line II-II of the magnetic head slider shown in FIG. 2.

The structure of the magnetic head slider 11 will be described below in more detail with reference to FIG. 3. FIG. 3 is a schematic sectional view in the direction perpendicular to the air bearing surface S in the magnetic head slider 11 and to the track width direction (schematic sectional view along line II-II in FIG. 2). As described above, the magnetic head slider 11 has the substrate 13 of the nearly rectangular plate shape and the laminate 14 laid on the side face of the substrate 13. The laminate 14 has the thin-film magnetic head 10 and a coat layer 50 surrounding this thin-film magnetic head 10.

The thin-film magnetic head 10 has a GMR (Giant Magneto-Resistive) element 40 as a reading element for reading magnetic information on the hard disk, and an induction type electromagnetic conversion element 60 as a writing element for writing magnetic information on the hard disk, in the order named from the near side to the substrate 13, and is thus a composite thin-film magnetic head.

The electromagnetic conversion element 60 is one adopting the so-called longitudinal recording method, and is provided with a lower magnetic pole 61 and an upper magnetic pole 64 in order from the substrate 13 side and further with a thin-film coil 70.

The ends of the lower magnetic pole 61 and the upper magnetic pole 64 on the air bearing surface S side are exposed in the air bearing surface S and the exposed portions of the lower magnetic pole 61 and the upper magnetic pole 64 are spaced from each other by a predetermined distance to form a recording gap G. On the other hand, the end 64B of the upper magnetic pole 64 on the far side from the air bearing surface S is bent toward the lower magnetic pole 61 and the end 64B is magnetically coupled with the end of the lower magnetic pole 61 on the far side from the air bearing surface S. This configuration forms a magnetic circuit with the gap G in between the upper magnetic pole 64 and the lower magnetic pole 61.

The thin-film coil 70 is arranged so as to surround the end 64B of the upper magnetic pole 64 and generates a magnetic field in the recording gap G by electromagnetic induction, thereby recording magnetic information on the recording surface of the hard disk.

The GMR element 40 has a multilayer structure, which is not shown, is exposed in the air bearing surface S, and functions to detect a change in a magnetic field from the hard disk by making use of the magneto-resistance effect, to read magnetic information.

The insulating coat layer 50 is located between the GMR element 40 and the electromagnetic conversion element 60 and between the upper magnetic pole 64 and the lower magnetic pole 61 so as to separate them from each other. The thin-film magnetic head 10 itself is also coated except for the air bearing surface S with the coat layer 50. The coat layer 50 is made mainly of an insulating material such as alumina. Specifically, the coat layer is normally an alumina layer made by sputtering or the like. The alumina layer of this kind normally has an amorphous structure.

The thin-film magnetic head 10 may be of the perpendicular recording method, instead of the longitudinal recording method. The GMR element 40 may be replaced by an AMR (Anisotropic Magneto-Resistive) element making use of the anisotropic magneto-resistance effect, a TMR (Tunnel-type Magneto-Resistive) element making use of the magneto-resistance effect occurring at a tunnel junction, or the like.

Furthermore, the coat layer 50 may further include a magnetic layer or the like for magnetically insulating the GMR element 40 and the electromagnetic conversion element 60 from each other.

[Production Method of Magnetic Head Slider]

The following will describe a production method of the magnetic head slider 11 as described above.

Figure 4:
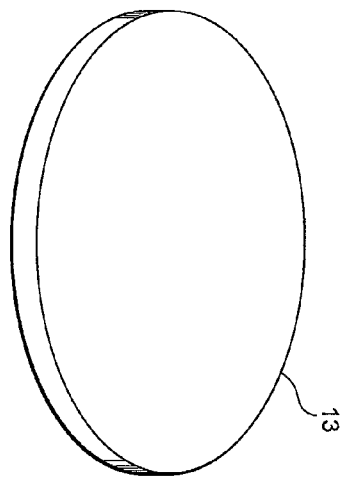
FIG. 4 is a perspective view showing a substrate made in a disk wafer shape of a sintered body.
Figure 5:
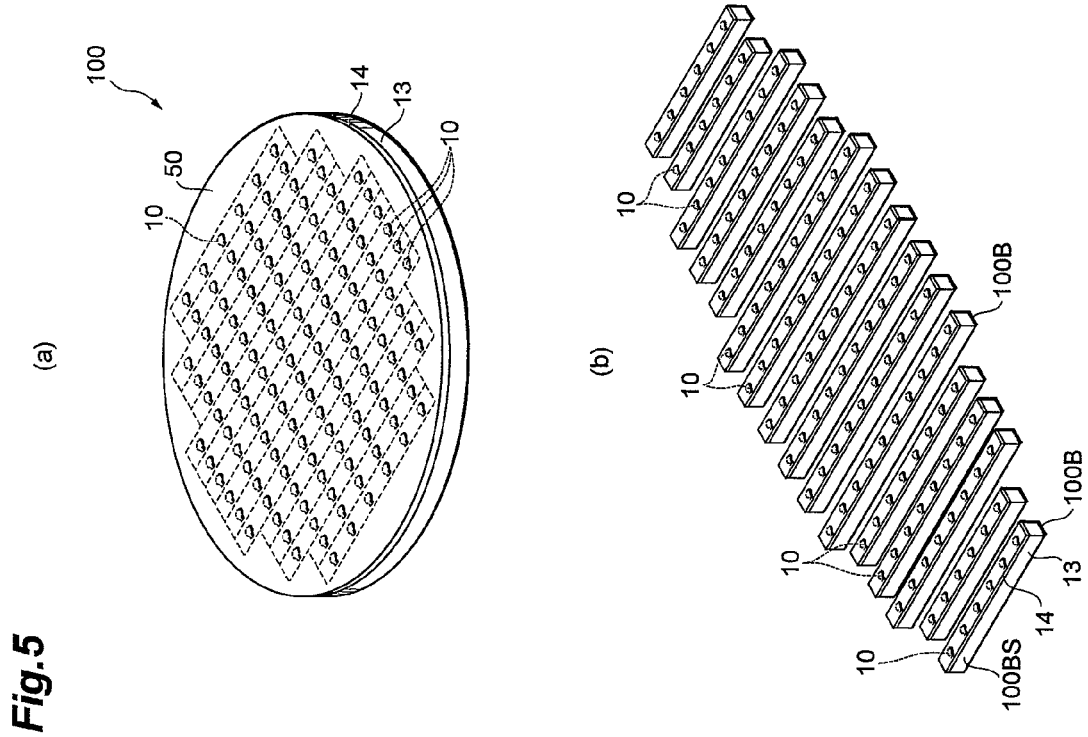
FIG. 5 is a perspective view subsequent to FIG. 4 for explaining a production method of the magnetic head slider.

The first step is, as shown in FIG. 4, to prepare the substrate 13 made in a disk wafer shape of the aforementioned sintered body of the present embodiment. The next step is, as shown in FIG. 5(a), to lay a laminate 14 including the thin-film magnetic heads 10 and coat layer 50, on the substrate 13 by a well-known method to obtain a multilayer structure 100. The laminate 14 is formed herein so that a large number of thin-film magnetic heads 10 are arrayed in a matrix in the laminate 14.

Then the multilayer structure 100 is cut in a predetermined shape and size. In the present embodiment, for example, it is cut as indicated by dashed lines in FIG. 5(a) to form bars 100B in each of which a plurality of thin-film magnetic heads 10 are arranged in a line and these thin-film magnetic heads 10 are arranged so as to be exposed in a side face 100BS, as shown in FIG. 5(b).

After formation of the bars 100B, the so-called lapping step is then carried out to polish the side face 100BS of each bar 100B so as to form the air bearing surface S. In this step, the substrate 13 and the laminate 14 laid thereon are polished simultaneously and in a direction perpendicular to the lamination direction (i.e., in the direction of arrow X in FIG. 3).

If the molar ratio y of oxygen in $TiC_xO_y$ in the substrate 13 (sintered body) forming each bar 100B is not more than 0.3, the polishing rate of the substrate 13 forming the bar 100B tends to become low in the lapping step, whereby the level difference can be made between the substrate 13 and the laminate 14. In contrast to it, since the ratio y falls within the range of $0.3 < y \leq 0.52$ in the present embodiment, it is easier to increase the polishing rate of the substrate 13 and thereby to reduce the level difference between the substrate 13 and the laminate 14 than in the case where the ratio y is not more than 0.3.

After the lapping step, the air bearing surface S is subjected to ion milling being a kind of dry etching, to form the air inlet groove 11a (not shown) in the air bearing surface S.

If the substrate 13 (sintered body) forming each bar 100B consists of the two phases of the phase of $Al_2O_3$ and the phase of $TiC_xO_y$, chipping becomes more likely to occur during the cutting step. In contrast to it, since the substrate 13 (sintered body) in the present embodiment further has the phase of Al—Ti—O in addition to the two phases of the phase of $Al_2O_3$ and the phase of $TiC_xO_y$, chipping can be suppressed with more certainty than in the case where the substrate 13 does not include the phase of Al—Ti—O.

If the substrate 13 (sintered body) forming the bar 100B further includes the phase of carbon in addition to the three phases of the phase of $Al_2O_3$, the phase of $TiC_xO_y$, and the phase of Al—Ti—O, there are crystal grains of carbon (graphite) as well as the crystal grains of $Al_2O_3$, the crystal grains of $TiC_xO_y$, and the crystal grains of Al—Ti—O in the air bearing surface S. When such an air bearing surface S is subjected to ion milling, it is hard to evenly etch the whole air bearing surface S and the air bearing surface S after the dry etching tends to be unlikely to smooth. The inventors believe that the above phenomenon is caused for the following reasons: easiness to etch the sintered body by ion milling is dependent on hardness of crystals forming the sintered body; and the crystal phase of carbon (graphite) being soft with low hardness is etched too quickly by ion milling.

In contrast to it, the substrate 13 (sintered body) in the present embodiment consists of the three phases of the phase of $Al_2O_3$, the phase of $TiC_xO_y$, and the phase of Al—Ti—O without inclusion of the phase consisting of carbon, the whole air bearing surface S is more evenly etched and the air bearing surface S after the ion milling becomes more smoothed, than in the case where the sintered body includes the phase consisting of carbon.

After the ion milling, each bar 100B is cut at appropriate positions so that each piece includes a thin-film magnetic head 10; whereby we can obtain a plurality of magnetic head sliders 11 each having the thin-film magnetic head 10. Before or after this cutting step, the air bearing surface may be further coated with a layer of DLC or the like.

The above-described production method of the magnetic head slider 11 of the embodiment enables the smooth air bearing surface S to be formed, for example, even in cases where femto-sliders or much smaller sliders are formed in order to be mounted on downsized HDDs, and permits us to obtain the magnetic head slider 11 fully adaptable for reduction in the fly height.

The present invention will be described below in further detail with examples thereof, but it should be noted that the present invention is by no means intended to be limited to these examples.

Examples 1-14 and Comparative Examples 1-4

Production of Sintered Body

First, the raw material powder was prepared by mixing the $Al_2O_3$ powder (average grain size: 0.5 μm), the TiC powder (average grain size: 0.5 μm), and the $TiO_2$ powder (average grain size: 0.3 μm). The respective contents (unit: % by mass) of the $Al_2O_3$ powder, the TiC powder, and the $TiO_2$ powder in the raw material powder and the mass ratio of the TiC powder to the $Al_2O_3$ powder ($TiC/Al_2O_3$) were set to be the values shown in Table 1.

Next, the raw material powder was pulverized and mixed with IPA (isopropyl alcohol; boiling point 82.4° C.) in a ball mill for 30 minutes and thereafter the mixture was granulated by spray granulation at 150° C. in a nitrogen atmosphere to obtain granules. The resultant granules were primarily compacted by cold press to obtain a compact. In the cold press, the granules were compressed under the pressure of about 5 MPa (50 kgf/cm²)

Thereafter, the compact was fired for two hours by hot press to obtain the sintered body in each of Examples 1 to 14 and Comparative Examples 1 to 4. In the hot press, a firing atmosphere was vacuum. The firing temperature and the pressure (kgf/cm²) on the compact by hot press were set to be the values shown in Table 1.

TABLE 1

| | Raw material powder | | | | Hot press | |
|---|---|---|---|---|---|---|
| | Content (mass %) | | | Mass ratio (—) TiC/ $Al_2O_3$ | Firing temperature (° C.) | Pressure (kgf/ cm²) |
| | $Al_2O_3$ | TiC | $TiO_2$ | | | |
| Comparative Example 1 | 52.6 | 31.5 | 15.9 | 0.60 | 1600 | 67 |
| Example 1 | 52.6 | 31.5 | 15.9 | 0.60 | 1600 | 100 |
| Example 2 | 52.6 | 31.5 | 15.9 | 0.60 | 1450 | 133 |
| Example 3 | 52.6 | 31.5 | 15.9 | 0.60 | 1500 | 133 |
| Example 4 | 52.6 | 31.5 | 15.9 | 0.60 | 1550 | 133 |
| Example 5 | 52.6 | 31.5 | 15.9 | 0.60 | 1600 | 133 |
| Example 6 | 52.6 | 31.5 | 15.9 | 0.60 | 1600 | 190 |
| Comparative Example 2 | 52.6 | 31.5 | 15.9 | 0.60 | 1600 | 267 |
| Comparative Example 3 | 52.6 | 31.5 | 15.9 | 0.60 | 1500 | 400 |
| Example 7 | 57.5 | 34.5 | 7.9 | 0.60 | 1500 | 133 |
| Example 8 | 50.1 | 30.0 | 19.9 | 0.60 | 1500 | 133 |
| Example 9 | 55.0 | 33.0 | 12.0 | 0.60 | 1600 | 100 |
| Example 10 | 63.0 | 21.0 | 16.2 | 0.33 | 1500 | 133 |
| Example 11 | 58.0 | 26.0 | 15.9 | 0.45 | 1500 | 133 |
| Example 12 | 50.0 | 34.0 | 15.9 | 0.68 | 1500 | 133 |
| Example 13 | 48.5 | 35.7 | 15.8 | 0.74 | 1500 | 133 |
| Example 14 | 47.5 | 28.5 | 24.0 | 0.60 | 1500 | 133 |
| Comparative Example 4 | 45.0 | 27.0 | 28.0 | 0.60 | 1500 | 67 |

[Evaluation of Characteristics]
(Check on Composition of Sintered Body)
The compositions of the respective sintered bodies of Examples 1 to 14 and Comparative Examples 1 to 4 were measured by TEM-EDS mapping. Table 2 provides the compositions of the sintered bodies confirmed by the measurement.

polisher using a slurry containing diamond particles having the diameter of 0.1 μm. The polishing conditions herein were as follows: the number of rotations of a tin plate 37.5 rota-

TABLE 2

| | Composition of sintered body | y | Peak area ratio | Lattice constant pm | Polishing rate % | | Profile irregularity | Chipping |
|---|---|---|---|---|---|---|---|---|
| Comparative Example 1 | $Al_2O_3 + TiC_xO_y$ | 0.41 | 1.73 | 430.2 | 174 | A | A | D |
| Example 1 | $Al_2O_3 + TiC_xO_y + (Al—Ti—O)$ | 0.35 | 1.76 | 431.0 | 171 | A | A | A |
| Example 2 | $Al_2O_3 + TiC_xO_y + (Al—Ti—O)$ | 0.31 | 1.72 | 430.7 | 180 | A | A | A |
| Example 3 | $Al_2O_3 + TiC_xO_y + (Al—Ti—O)$ | 0.33 | 1.77 | 431.1 | 182 | A | A | A |
| Example 4 | $Al_2O_3 + TiC_xO_y + (Al—Ti—O)$ | 0.31 | 1.76 | 430.6 | 167 | A | A | A |
| Example 5 | $Al_2O_3 + TiC_xO_y + (Al—Ti—O)$ | 0.32 | 1.83 | 430.8 | 167 | A | A | A |
| Example 6 | $Al_2O_3 + TiC_xO_y + (Al—Ti—O)$ | 0.34 | 1.85 | 431.0 | 162 | A | A | A |
| Comparative Example 2 | $Al_2O_3 + TiC_xO_y + (Al—Ti—O) + C$ | 0.25 | 1.77 | 431.1 | 180 | A | D | A |
| Comparative Example 3 | $Al_2O_3 + TiC_xO_y + (Al—Ti—O) + C$ | 0.23 | 1.69 | 431.7 | 189 | A | D | A |
| Example 7 | $Al_2O_3 + TiC_xO_y + (Al—Ti—O)$ | 0.15 | 1.80 | 432.0 | 101 | C | A | B |
| Example 8 | $Al_2O_3 + TiC_xO_y + (Al—Ti—O)$ | 0.40 | 1.71 | 429.7 | 180 | A | A | A |
| Example 9 | $Al_2O_3 + TiC_xO_y + (Al—Ti—O)$ | 0.32 | 1.77 | 431.4 | 122 | B | A | B |
| Example 10 | $Al_2O_3 + TiC_xO_y + (Al—Ti—O)$ | 0.34 | 1.01 | 431.0 | 120 | B | A | B |
| Example 11 | $Al_2O_3 + TiC_xO_y + (Al—Ti—O)$ | 0.32 | 1.30 | 431.6 | 132 | B | A | A |
| Example 12 | $Al_2O_3 + TiC_xO_y + (Al—Ti—O)$ | 0.31 | 1.90 | 431.3 | 161 | A | A | A |
| Example 13 | $Al_2O_3 + TiC_xO_y + (Al—Ti—O)$ | 0.30 | 2.18 | 431.5 | 115 | B | A | C |
| Example 14 | $Al_2O_3 + TiC_xO_y + (Al—Ti—O)$ | 0.52 | 1.71 | 428.5 | 170 | A | A | B |
| Comparative Example 4 | $Al_2O_3 + TiC_xO_y$ | — | — | — | — | — | — | — |

As seen from Table 2, it was confirmed that each of the sintered bodies of Examples 1 to 14 consisted of the three phases of the crystal phase of $Al_2O_3$, the crystal phase of $TiC_xO_y$, and the crystal phase of Al—Ti—O. It was also confirmed that in Examples 1 to 14, $0.5<x+y\leq1$, $x>0$ and $y>0$. On the other hand, it was confirmed that the sintered body of Comparative Example 1 consisted of the two phases of the crystal phase of $Al_2O_3$ and the crystal phase of $TiC_xO_y$. It was also confirmed that the sintered bodies of Comparative Examples 2 and 3 consisted of four phases, the crystal phase of $Al_2O_3$, the crystal phase of $TiC_xO_y$, the crystal phase of Al—Ti—O, and the crystal phase of graphite.

In Comparative Example 4, the compact was deformed during the hot press of the compact in the production process of the sintered body and the shape of the sintered body was not the desired one suitable for production of the magnetic head slider. Therefore, for the sintered body of Comparative Example 4, measurement was not carried out as to the peak area ratio, lattice constant, polishing rate, chipping, and profile irregularity after ion milling described below.

(Measurement of Peak Area Ratio of $TiC_xO_y/Al_2O_3$)

For each of the sintered bodies of Examples 1 to 14 and Comparative Examples 1 to 3, the measurement by XRD was carried out and the peak area ratio $TiC_xO_y/Al_2O_3$ of $TiC_xO_y$ to $Al_2O_3$ was calculated. The results obtained are provided in Table 2.

(Measurement of Lattice Constant of $TiC_xO_y$)

Each of the lattice constants of $TiC_xO_y$ in the respective sintered bodies of Examples 1 to 14 and Comparative Examples 1 to 3 was calculated based on the X-ray measurement using Si of the standard sample, as described above. The results obtained are provided in Table 2.

(Measurement of Polishing Rate)

A piece of about 20×20×1.8 mm was cut out from each of the sintered bodies of Examples 1 to 14 and Comparative Examples 1 to 3, and the piece was lapped with a single-side polisher using a slurry containing diamond particles having the diameter of 0.1 μm. The polishing conditions herein were as follows: the number of rotations of a tin plate 37.5 rotations/min; load 2550 g; the number of rotations of an oscar motor 55 rotations/min; polishing time 10 minutes. A polishing speed (unit: μm/10 min) of each of the sintered bodies of Examples 1 to 14 and Comparative Examples 1 to 3 was acquired by measuring thicknesses before and after the polishing, and dividing a difference thereof by the polishing time. Then the polishing speed was divided by a reference speed of 1.2 μm/10 min, thereby obtaining polishing rates (unit: %) of the respective sintered bodies of Examples 1 to 14 and Comparative Examples 1 to 3. The results are provided in Table 2. In Table 2, the polishing rates are evaluated based on the following criteria: "A" for a polishing rate of not less than 150; "B" for a polishing rate between 110 inclusive and 150; "C" for a polishing rate between 100 inclusive and 110. The polishing rate is preferably as large as possible and preferably A, B, or C.

(Measurement of Profile Irregularity after Ion Milling)

Each of the sintered bodies of Examples 1 to 14 and Comparative Examples 1 to 3 was lapped by the aforementioned method to form a polished surface, the polished surface was then subjected to ion milling, and surface roughness Ra (profile irregularity) was measured in the polished surface after the ion milling (dry etched surface). The results are provided in Table 2. In Table 2, the profile irregularities are evaluated based on the following criteria: "A" for a profile irregularity of not more than 10 nm; "D" for a profile irregularity of more than 10 nm. The smaller the profile irregularity, the smoother the dry etched surface is. Therefore, the profile irregularity is preferably as small as possible.

(Evaluation of Chipping)

Each of the sintered bodies of Examples 1 to 14 and Comparative Examples 1 to 3 was evaluated as to chipping by the method described below. First, a test piece of about 57.6 mm×10 mm×1.2 mm was cut out of each sintered body. Then each test piece was cut at 9500 rpm and at a feed rate of 100 mm/min, using a dicing blade (outside diameter 54 mm×inside diameter 40 mm×thickness 0.2 mm) available from DISCO Corporation, and thereafter the test piece thus cut was observed at the magnification of 2000× with an optical microscope to check whether chipping occurred near the cut surface of the test piece. The results of the evaluation of chipping are provided in Table 2. In Table 2, the chipping was evaluated based on the following criteria: "A" for a sintered body wherein chips are less than 5 μm; "B" for a sintered body wherein a rate of chips between 5 and 10 μm relative to a total count of observed chips is less than 5%; "C" for a sintered body wherein a rate of chips between 5 and 10 μm relative to a total count of observed chips is not less than 5%; "D" for a sintered body wherein chips exceed 10 μm. The result of the evaluation of chipping is preferably A, B, or C.

As shown in Table 2, it was confirmed that in Examples 1 to 14 the polishing rate was high, the profile irregularity was small, and the chipping was unlikely to occur. It was confirmed on the other hand that in Comparative Example 1 the chipping was more likely to occur than in Examples 1 to 14.

It was further confirmed that in Comparative Examples 2 and 3 the profile irregularity was larger and the dry etched surface was less smooth than in Examples 1 to 14.

It was also confirmed that in Examples 1-6, 8-12, and 14 where $0.3 < y \leqq 0.52$ among Examples 1 to 14, the polishing rate was higher than in Example 7 where y was not more than 0.3 and the chipping was less likely to occur than in Example 13 where y was 0.3.

What is claimed is:

1. A sintered body consisting of:
    $Al_2O_3$;
    a compound represented by the chemical formula (1) below; and
    a composite oxide containing Al and Ti, $$TiC_xO_y \qquad (1)$$

wherein $x+y \leqq 1$, $x>0$ and $y>0$.

2. The sintered body according to claim 1, wherein $0.3 < y \leqq 0.52$.

* * * * *